Feb. 25, 1958    N. L. WEINBERG ET AL    2,824,976
PULSE GENERATOR
Filed Oct. 18, 1956

INVENTORS
Norman L. Weinberg &
Joseph E. Sunderlin
BY
ATTORNEY

United States Patent Office 2,824,976
Patented Feb. 25, 1958

2,824,976

PULSE GENERATOR

Norman L. Weinberg and Joseph E. Sunderlin, Baltimore, Md., assignors to Westinghouse Electric Corporation, East Pittsburgh, Pa., a corporation of Pennsylvania Application October 18, 1956, Serial No. 616,759

8 Claims. (Cl. 307—88)

This invention relates to an all-magnetic pulse generator and more particularly to an all-magnetic pulse quadrupling circuit.

It is an object of this invention to provide a pulse generator employing inductive and capacitive circuit elements exclusively.

More specifically, it is an object of this invention to provide a magnetic pulser which will produce unidirectional output pulses at a repetition rate which is quadruple that of the input frequency. Pulse generators of this type are particularly useful in installations where space conservation, low maintenance, and rugged construction are required.

The above and other objects and features of the invention will become readily apparent from the following detailed description taken in connection with the accompanying drawings, in which.

Figure 1:
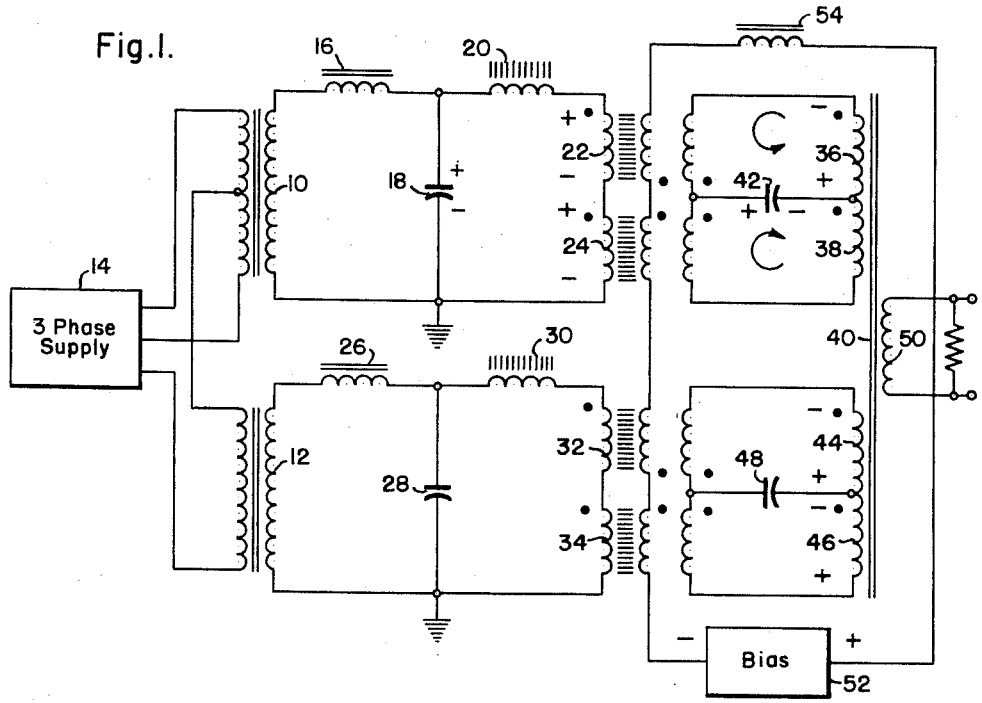
Fig. 1 is a schematic circuit diagram of one embodiment of the present invention.

Referring to Fig. 1, the pulse generator shown includes two input transformers 10 and 12. The primary windings of the input transformers are connected to a three phase source of alternating current voltage 14 through a Scott connection which converts the three-phase supply to a two-phase system wherein the alternating current waveform appearing across the secondary of transformer 10 is 90° out of phase with respect to the waveform appearing across the secondary of transformer 12.

An inductor 16 and a capacitor 18 are connected between the opposite terminals of the secondary winding of transformer 10; and this capacitor is connected in a closed loop circuit arrangement with a saturable reactor 20 and the primary windings of the two saturable core transformers 22 and 24. In a similar manner, an inductor 26 and a capacitor 28 are connected between the opposite terminals of the secondary winding of transformer 12; and capacitor 28 is connected in a closed loop circuit arrangement with a second saturable reactor 30 and the primary windings of saturable core transformers 32 and 34.

The secondary windings of transformers 22 and 24 are connected in a closed loop circuit arrangement with two primary windings 36 and 38 of an output transformer 40. A capacitor 42 couples the junction of the secondary windings of transformers 22 and 24 to the junction of windings 36 and 38, substantially as shown. Likewise, the secondary windings of transformers 32 and 34 are connected in a closed loop circuit arrangement with the primary windings 44 and 46 of transformer 40; and a capacitor 48 couples the junction of the respective saturable core transformer windings with the junction of the output transformer windings. Output voltages are derived from the circuit across the secondary winding 50 of transformer 40.

A source of bias voltage is applied through inductor 54 to the serially-connected tertiary windings of the saturable core transformers 22, 24, 32 and 34 for a purpose which will hereinafter be explained.

The manner in which the primary and secondary windings of the respective transformers are wound on their associated cores is indicated in the drawings by dots which represent points of like instantaneous polarity. If the dots are on the same end of the transformer core, the windings are wound around the core in the same direction; whereas, if the dots are on opposite ends of the core, the windings are wound in opposite directions.

The cores of transformers 22, 24, 32 and 34 and the cores of reactors 20 and 30 are formed from square loop hysteresis materials such as Hypernik V. As is well known, a core material of this type presents a sharp cutoff point between conditions of saturation and unsaturation. When a core is saturated, it will, of course, present a much lower impedance than when unsaturated. The point at which the core saturates is a function of the flux density of the core which, in turn, is proportional to the volt-second integral of the voltage across the reactor. By applying a bias current to a winding on the core member, such as that from voltage source 52, the core can be preset toward or away from the saturation level under consideration depending upon the current and winding polarities. From the polarity points on the bias windings, it can be seen that transformer 24 will saturate when the polarity of the voltage across capacitor 18 is as shown; whereas, transformer 22 will saturate when the polarity across capacitor 18 is reversed with respect to that shown. In a similar manner, transformer 34 will saturate with one polarity of the voltage across capacitor 28; whereas, transformer 32 will saturate when the polarity is reversed.

Figure 2:
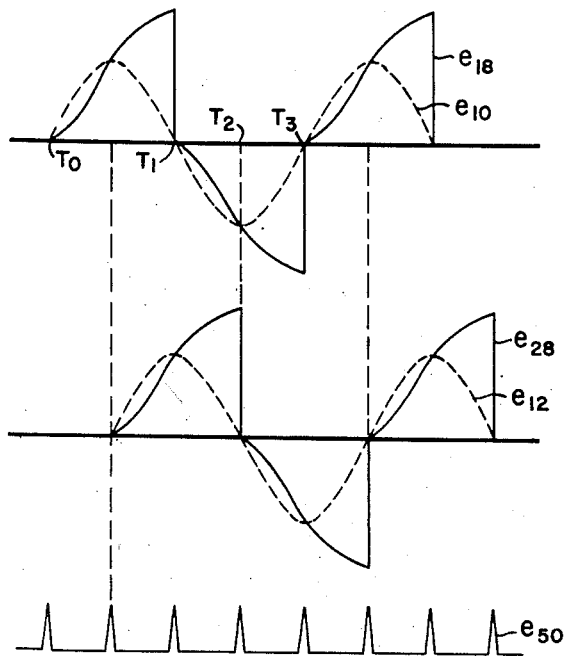
Fig. 2 is a graphical illustration of the operation of the circuit in Fig. 1 showing waveforms appearing at various points in the circuit of Fig. 1.

Operation of the circuit may best be understood by reference to Fig. 2 where the voltage waveforms appearing across the secondaries of transformers 10 and 12 ($e_{10}$, $e_{12}$), the voltages appearing across capacitors 18 and 28 ($e_{18}$, $e_{28}$) and the voltage across the output winding 50 ($e_{50}$) are shown. Starting at Time $T_0$, capacitor 18 will be charged with the polarity shown in Fig. 1 until the saturable reactor 20 saturates and presents a low impedance at time $T_1$. At this point, voltages will be induced across the primary windings of transformers 22 and 24 with the indicated polarity to charge capacitor 42 as shown. The current paths for this part of the cycle are illustrated by the arrows in Fig. 1. It will be noted that the flux lines generated from these currents in the core of transformer 40 will cancel, thus preventing any coupling between capacitors 42 and 48. Since the voltages on the bias winding and the primary winding of transformer 24 are additive, it will saturate while transformer 22 remains unsaturated. When transformer 24 saturates, capacitor 42 will discharge into the load winding 50 through transformer 40. The voltages induced in the windings 36, 44, and 46 during this time are indicated by the polarity marks shown. As will be understood, the currents caused by these induced voltages are seen to oppose the bias current, thus insuring that in this condition transformers 22, 32, and 34 are unsaturated. With these transformers unsaturated a negligible amount of current will flow in their loops; and there will be no interaction between circuits.

Figure 3:
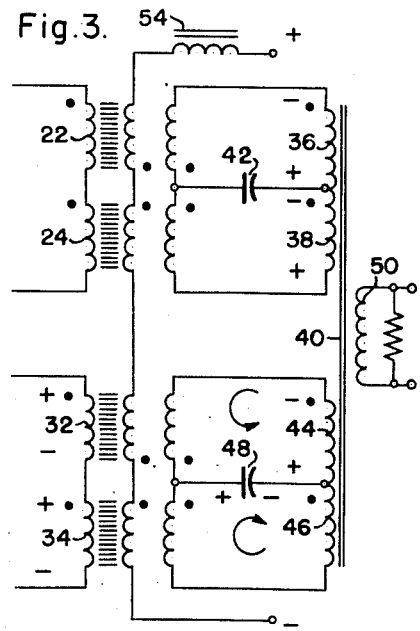
Fig. 3 shows a portion of the circuit of Fig. 1 illustrating the operation of the circuit under a predetermined set of conditions.

The condition of the circuit at time $T_2$ is shown in Fig. 3. At this time capacitor 28 will discharge through saturable reactor 30 to produce the indicated polarities across the primary windings of transformers 32 and 34. Under these conditions, transformer 34 will saturate since the voltage induced across its primary adds to that across the bias winding, and capacitor 48 will discharge through winding 46 to produce an output pulse across winding 50. As was the case when transformer 24 saturated, the voltages induced across windings 36, 38, and 44 during discharge of capacitor 48 will generate currents which oppose the bias in transformers 22, 24 and 32. This insures that transformers 22, 24, and 32 be unsaturated; and, therefore, no interaction between circuits will occur since negligible current will flow.

At time $T_3$ shown in Fig. 2, transformer 22 will saturate and at time $T_4$ transformer 32 will saturate. It can be seen that the flux in transformer 40, due to discharge of capacitor 42 or 48 when one of the saturable transformers saturates, is always in the same direction. Consequently, a series of output voltage pulses of one polarity, having a repetition frequency equal to four times the frequency of source 14, will appear across output winding 50.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In combination, a first source of alternating current voltage, a second source of alternating current voltage which is 90 degrees out of phase with respect to said first voltage source, four saturable core transformers, primary and secondary windings for each of said transformers, an output transformer having four primary windings and a single secondary winding, a first inductor and a first capacitor connected in series across said first voltage source, a second inductor, and a second capacitor connected in series across said second voltage source, a first saturable reactor connected in series with the first capacitor and the primary windings of two of said saturable core transformers to form a closed circuit loop, a second saturable reactor connected in series with the second capacitor and the primary windings of the other two of the saturable core transformers to form a closed circuit loop, a third capacitor connected in a closed loop circuit arrangement with the secondary winding of a first of said saturable transformers and a first primary winding of said output transformer, means connecting said third capacitor in a closed loop circuit arrangement with the secondary winding of a second of said saturable transformers and with a second primary winding of said output transformer, a fourth capacitor connected in a closed loop circuit arrangement with the secondary winding of a third of said saturable transformers and a third primary winding of said output transformer, means connecting the fourth capacitor in a closed loop circuit arrangement with the secondary winding of a fourth said saturable transformers and with the fourth primary winding of said output transformer, and means for deriving an output voltage from across the secondary winding of said output transformer.

2. The combination claimed in claim 1 and including means for applying a bias voltage to the cores of said saturable transformers.

3. In a pulse generator, the combination of first and second sources of alternating current voltage, a first capacitor and a first inductor connected in series across one of said voltage sources, a second capacitor and a second inductor connected in series across the other of said voltage sources, four saturable core transformers, primary and secondary windings for each of said transformers, means for connecting the primary winding of two said transformers in series and for applying voltages developed across said first capacitor to said primary windings in series, means for connecting the primary windings of the other two of said transformers in series and for applying voltages developed across said second capacitor to the latter-mentioned series connected windings, a common terminal for a first pair of said secondary windings, a common terminal for a second pair of said secondary windings, an output transformer having four primary windings means connecting two of the primary windings of said output transformer in series between the uncommon terminals of said first pair of secondary windings, a capacitor connected between the junction of said two output transformer primary windings and the junction of said first pair of secondary windings, means connecting the other two primary windings of said output transformer in series between the uncommon terminals of said second pair of secondary windings, a capacitor connected between the junction of said other two output transformer primary windings and the junction of said second pair of secondary windings, and a secondary winding for said output transformer for deriving an output from said pulse generator.

4. The combination claimed in claim 3 wherein one source of alternating current voltage is out of phase with respect to the other.

5. In a pulse transformer, the combination of first and second sources of alternating current voltage, four saturable core transformers, primary and secondary windings for each of said transformers, means for applying one of said voltage sources across two of said primary windings connected in series, means for applying the other of said voltage sources across the other two of said primary windings connected in series, an output transformer having four primary windings, means connecting the secondary windings of two of said saturable transformers in series with two of said output transformer primary windings to form a closed circuit loop in which the two windings of each transformer are directly connected end-to-end, a capacitor coupling the junction of said two secondary windings to the junction of said two output transformer primary windings, means connecting the secondary windings of the other two of said saturable transformers in series with the other two of said output transformer primary windings to form a closed loop in which the two windings of each transformer are directly connected end-to-end, a capacitor coupling the junction of said other two secondary windings to the junction of said other two output transformer primary windings, and means inductively associated with the output transformer for deriving an output voltage from said pulse generator.

6. In a pulse generator, four saturable core transformers, means for driving said cores to saturation in succession, winding means inductively associated with each of said saturable transformers, an output transformer having four primary windings, a first capacitor connected in a closed loop circuit arrangement with the winding means of a first of said saturable transformers and with a first of said primary windings, means connecting the winding means of a second of said saturable transformers and a second of said primary windings in a closed loop circuit arrangement with said first capacitor, a second capacitor connected in a closed loop circuit arrangement with the winding means of a third of said saturable transformers and with a third of said primary windings, means connecting the winding means of a fourth of said saturable transformers and a fourth of said primary windings in a closed loop circuit arrangement with said second capacitor, and a secondary winding for said output transformer for deriving an output voltage from said generator.

7. The combination claimed in claim 6 and including means for biasing said first and second saturable transformers to saturate in opposite directions, and means for biasing said third and fourth saturable transformers to saturate in opposite directions.

8. The combination claimed in claim 6 wherein the respective winding means are wound about their associated cores such that when one of said saturable transformers saturates, a voltage will be induced in one of the primary windings of said output transformer which will, in turn, induce voltages in the other primary windings of said output transformer tending to prevent saturation of the other saturable core transformers.

No references cited.